United States Patent [19]

Jeon et al.

[11] Patent Number: 5,701,300
[45] Date of Patent: Dec. 23, 1997

[54] CONNECTIONLESS SERVER FOR AN ASYNCHRONOUS TRANSFER MODE NETWORK

[75] Inventors: Byung Chun Jeon; Mi Sun Do; Chun Kwan Park; Chang Whan Oh; Young Sun Kim, all of Daejeon, Rep. of Korea

[73] Assignees: Electronics and Telecommunications Research Institute, Daejeon; Korea Telecommunication Authority, Seoul, both of Rep. of Korea

[21] Appl. No.: 577,346

[22] Filed: Dec. 22, 1995

[30] Foreign Application Priority Data

Dec. 22, 1994 [KR] Rep. of Korea ................. 1994-36106

[51] Int. Cl.$^6$ .......................................... H04L 12/56
[52] U.S. Cl. .................... 370/392; 370/395; 370/397
[58] Field of Search ................. 370/60, 60.1, 58.1, 370/58.2, 58.3, 94.1, 94.2, 94.3, 110.1, 85.13, 389, 392, 393, 395, 396, 397, 398, 399, 409, 473; 395/250, 200.2; 364/239, 239.6

[56] References Cited

U.S. PATENT DOCUMENTS

| | | | |
|---|---|---|---|
| 5,119,369 | 6/1992 | Tanabe et al. | 370/94.1 |
| 5,216,670 | 6/1993 | Ofek et al. | 370/94.1 |
| 5,271,004 | 12/1993 | Proctor et al. | 370/60 |
| 5,271,010 | 12/1993 | Miyake et al. | 370/94.1 |

*Primary Examiner*—Benedict V. Safourek
*Assistant Examiner*—Ajit Patel
*Attorney, Agent, or Firm*—Spencer & Frank

[57] ABSTRACT

A connectionless server for an ATM network carries out routing so that connectionless data generated in a local area network or a terminal is delivered to the appropriate destination. The connectionless server includes a cell header processor for delivering a destination address and an HCT (Header Conversion Table) write address to a destination address processor whenever a BOM or SSM cell is received, and for delivering the cell and an HCT read address to a header conversion processor whenever any cell is received. The destination address processor performs searching and delivers header conversion information (VPIo/VCIo/MIDo) generated from the destination address. The header conversion processor stores the header conversion information from the destination address process and converts the header value of the cell input from the cell header processor using header conversion information stored in a header conversion table. Since the cell copying function is optionally included in the server in the present invention, it is possible to use the server as a server for performing routing of cells having individual address values, as a multicast server only performing copying of group address cells, and as a compound connectionless sever able to process both group address cells and individual address cells at the same time. Variations in the length of the country code, national destination code, or subscriber number included in the destination address are accommodated by extracting header conversion information using all 64 bits of the destination address.

11 Claims, 18 Drawing Sheets

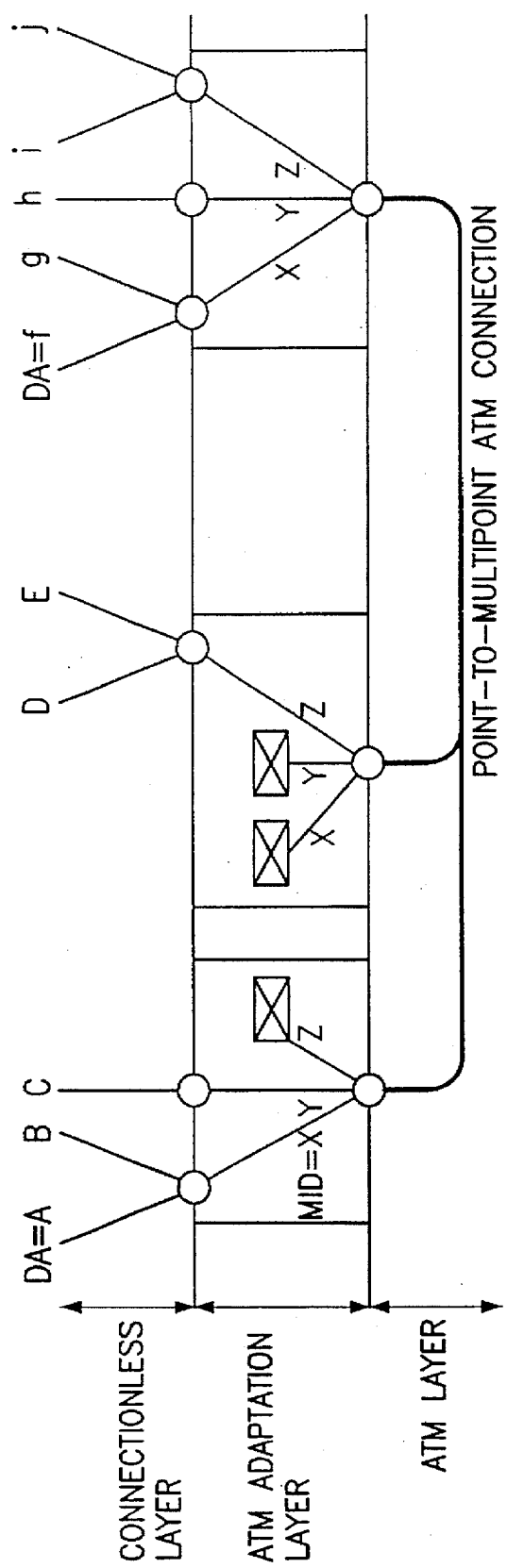

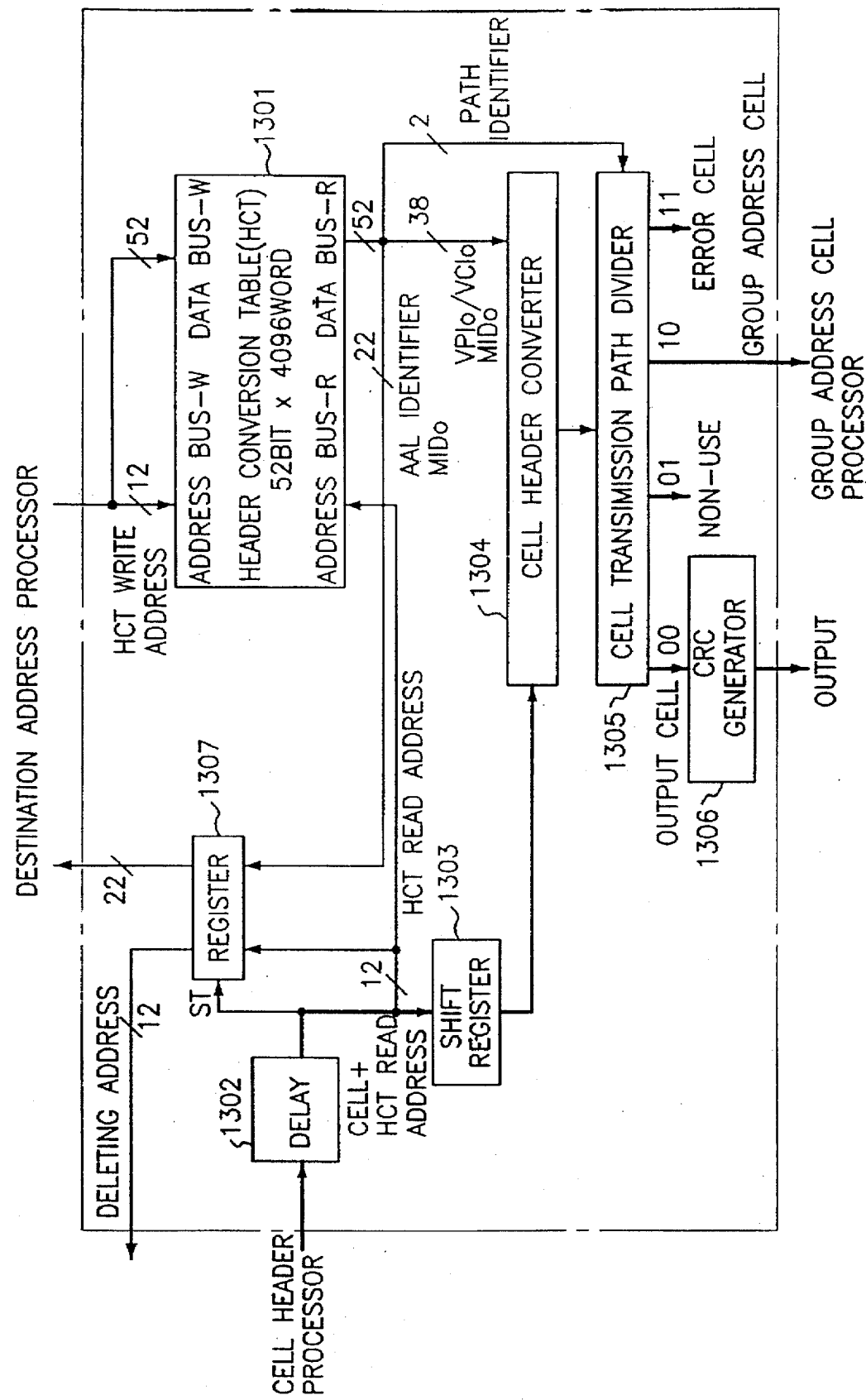

OUTPUT CELL HEADER

GROUP ADDRESS CELL HEADER

CONNECTIONLESS SERVER FOR AN ASYNCHRONOUS TRANSFER MODE NETWORK

BACKGROUND OF THE INVENTION

1. Field of the Invention

The present invention relates to a connectionless server apparatus for providing connectionless data service over an Asynchronous Transfer Mode (ATM) network, and particularly to a connectionless server connected to the ATM network so as to carry out routing of the connectionless data generated from local area networks, and then deliver them to their destinations.

2. Description of the Related Art

FIG. 1 illustrates a construction of a general ATM network to which the present invention is applied. The reference numerals 13 and 14 indicate an interworking unit (IWU) and a user terminal respectively.

The connectionless server 12 is connected to an ATM switch 11 and also connected to LANs or other connectionless servers through virtual connections. The connectionless server 12 delivers the cells received as input from a LAN or another connectionless server to a destination through a virtual connection to be output according to the destination address value.

FIG. 2 shows a protocol stack of an ATM switch, connectionless server, interworking unit and user terminal.

Since the protocol in the connectionless server is CLNAP (Connectionless Network Access Protocol which is recommended by ITU 1.364) and AAL (ATM Adaptation Layer) ¾, the interworking unit should have the function of converting the protocol used by the terminal 21 to the protocol used by the connectionless server 24.

The cells divided by using the AAL ¾ in the interworking unit are transferred to the connectionless server 24 through the ATM virtual connection between the user and the connectionless server. That is, the CLNAP PDU (protocol data unit) output from the interworking unit according to the ATM virtual connection value between the user and the server is delivered to the connectionless server 24.

The connectionless server 24 receives the CLNAP PDU and then searches routing information to be provided to the destination address. Also, the server 24 transfers the CLNAP PDU to the destination interworking unit via the ATM switch 25 through a corresponding ATM virtual connection set between the connectionless server and the destination terminal.

The destination interworking unit converts the CLNAP-PDU (Protocol Data Unit) from the connectionless server 24 to the LAN protocol PDU which the destination terminal 27 can handle.

FIG. 3 shows a sequence of converting the connectionless frame into cells in order that the connectionless frame received from a source user terminal is transmitted to the connectionless server in the same IWU.

By the interworking unit, a CLNAP-PDU 32 is constructed by adding a trailer consisting of a CRC-32 and a header including the address of the destination interworking unit to the connectionless frame (CLNAP-SDU) 31 received from the source user terminal.

And then, in a CPCS (Common Part Convergence Sublayer) layer, a CPCS-PDU 33 is constructed by appending a trailer and a header having the functions of frame size indicating and controlling error of the frame level to said CLNAP-PDU 32. In a SAR (Segmentation And Reassembly) layer, said CPCS-PDU 33 is divided into segments, each having a predetermined size (44 octets). When a plurality of CPCS-PDUs are multiplexed on the same virtual channel, an MID (Multiplexing IDentifier) is added to each segment in order to distinguish between them (all segments which belong to the same CPCS-PDU have the same MID, but segments which belong to different CPCS-PDUs have their own MIDs). In addition, ST (Segment Type) information is inserted into each segment to indicate which portion of the CPCS-PDU each segment is located in, that is, in order to indicate whether each segment (unless it is a single-segment message, SSM) is a BOM Beginning Of Message, COM (Continuation of Message), or EOM (End of Message). Finally a CRC (Cyclic Redundancy Check) about this information is added, the construction of a cell pay load (SAR-PDU) 34 of 48 octets.

Finally, in an ATM layer, a virtual path identifier (VPI) virtual channel identifier (VCI) which are assigned between the interworking unit and the connectionless server are appended to the SAR-PDU 34 together with control information so as to form an ATM cell 35 to be transferred.

FIG. 4 illustrates connection methods of connection servers consisting of several types of connectionless networks. The connectionless network is comprised of virtual connections between the connectionless servers or servers or between a server and the user in the ATM network.

The connectionless network topology can be of several types according to the of data traffic amount and the number of users, etc.

FIG. 4A shows the configuration of connectionless network in which all data from LANs and connectionless terminals are concentrated on one connectionless server within the ATM network. All LANs and connectionless terminals are connected to the connectionless server through ATM virtual connections in a star shape, and the connectionless server has the addresses of all users. This configuration is suitable for a small scale connectionless network.

FIG. 4B shows a configuration in which a few servers are connected to each other in a mesh configuration in the ATM network. The LANs and the terminals are connected to the nearest connectionless server respectively and each connectionless server has all addresses of the terminals and LANs in the connectionless network. This configuration is suitable for a larger amount of traffic as compared with that of FIG. 4A. However since each server should have routing information related to all users of the connectionless network, data should be changed in all servers when the user information changes.

FIG. 4C shows a configuration in which servers are connected to each other in a hierarchical configuration so that communications with other servers can be carried out through the upper server. Each connectionless server has the addresses of the only the users connected to itself. The connectionless server receives the CLNAP PDU and delivers the relevant CLNAP PDU to the upper server if it fails in searching for the destination address. The upper server should have the addresses of all users in the connectionless server.

For processing a CLNAP PDU having a group address in the connectionless network, a method to provide one GAA (group address agent) and the method to provide one GAA and several NGAAs (nested GAA) in the network are suggested in ITU Recommendation 1.364 of March 1994. GAA and NGAA have the function of copying the group address CLNAP PDU to several individual destinations included in the relevant group.

That is, FIG. 5A shows the method to provide only one GAA in which all CLNAP PDUs directed to several individual destinations included in the group address of the CLNAP PDU are copied and delivered. This method has a disadvantage in that the network efficiency is lowered since all group address frames are copied in the GAA. In the connectionless server 1, the CLNAP PDU having the group address is processed in the same manner as a CLNAP PDU having an individual address. But in the connectionless server 3 having the GAA function, as for the CLNAP PDU having the group address, the CLNAP PDUs are delivered after being copied to the individual address included in the group.

FIG. 5B shows the method to provide GAA and NGAA. GAA manages terminals having a partial individual address each and NGAA manages individual addresses more than two. The CLNAP PDU having the group address transmitted from the terminal is delivered to GAA, and GAA copies the frame and transmits the copies to the individual addressed destinations which are directly managed by the GAA itself and to the NGAAs. Each NGAA copies the CLNAP PDU received from the GAA and transmits the copies to the individual addressed destinations managed by itself. Since in this method the CLNAP PDU is copied and transmitted in the nearest NGAA to the terminal, the network efficiency is considerably improved. In this case, GAA of the connectionless server 3 has to copy the frame having group address and delivers the copies to the terminal and NGAA. The connectionless server 4 has to perform the function of providing a partial group address CLNAP PDU to GAA, and copying the CLNAP PDU received from the GAA and transmitting it to the terminal of the NGAA. In the ATM network, the GAA function can proceed regardless of the connectionless server, while the NGAA function makes network efficiency higher when it is carried out in the connectionless server to which the terminal is connected. Being connected to a plurality of LANs or terminals through the virtual channel, the connectionless server should be able to proceed with several virtual connections. In one virtual connection, since several CLNAP PDUS are multiplied by the multiplexing identifier (MID), one server should be able to proceed with a maximum of $N_{channel} \times N_{frame}$ frames at the same time (here $N_{channel}$ indicates the maximum number of virtual channels set by one server and $N_{frame}$ indicates the maximum number of CLNAP PDUS multiplied per a unit channel). Accordingly, the connectionless server should be able to proceed with a plurality of virtual connections, and also can proceed with a plurality of destination addresses since it should carry out routing by analyzing the destination address of the cells transmitted through a virtual connection.

However, the prior art has a disadvantage in that the maximum number of virtual connections and destination addresses which may be used is limited to 256.

And, a connectionless cell is routed by the destination address of the CLNAP PDU, and the destination address of the CLNAP PDU is composed of an address type field of 4 bits and an E.164 address field of 60 bits. The address type is used as indicator of the individual address indicating the specific destination and the group address indicating the address of the specific group.

The E.164 address field of 60 bits is divided to a country code, a national destination code and a subscriber number, of which the lengths are variable.

But, since the prior art considers that the length of each region is fixed when carrying out routing according to the E.164 address value and carries out routing by using only the national destination code and the subscriber number, it is a disadvantage in that it is hard to meet a variable network situation.

In the mean time, when a CLNAP PDU having a group address arrives in the connectionless server, the connectionless server copies more than one CLNAP PDU to the individual address of the relevant group for delivering it. In the prior art, a multicast server is provided in the network in order to copy all the group address CLNAP PDU.

However, in the above method, since the multicast server exists outside the connectionless server, a virtual connection between the connectionless server and the multicast server is necessary to transmit the traffic, the network efficiency is lower as compared with a method in which copying of cells is performed within the server, and the server structure becomes complicated.

In the ITU Recommendation 1.363 Annex, the MID allocation method in which more than one terminal is connected through one ATM connection is suggested. That is, as shown in FIG. 6, a plurality of terminals connected through one ATM virtual channel use a multiplexing identifier of different region, which selects the destination terminal of the cell. If this method is adapted to the connectionless server, the connectionless server should have a function to assign the different MID value according to the destination of the cell although using the same virtual connection in transmitting the cell to the terminal.

However, because the whole multiplexing identifier region of 10 bits is assigned by the coefficient multiplexer continuously in the above method, it has disadvantages in that a plurality of ATM adaptation layer connections can not be set to one virtual channel and a value which is already being used can be assigned to a new ATM adaptation layer connection in duplicate.

SUMMARY OF THE INVENTION

In order to solve the above problems, the present invention has as an object to provide a connectionless server system which can provide optional functions of GAA or NGAA by adding a cell copying function within the server.

It is another object to provide a connectionless server system which can handle more than 256 destination addresses more than and meet the case that the lengths of the country code, the national destination code and the subscriber number are changed by searching the relevant header conversion information using all the destination address field of 64 bits.

It is still another object to provide a connectionless server system in which a plurality of terminals can be connected to the server through one virtual connection by assigning different value of MIDs for the terminals.

It is a further object to provide a high speed connectionless server system in which the connectionless server is composed of a plurality of function blocks and each function block is able to perform pipeline processing.

In order to achieve the above objects, the present invention provides a connectionless server comprising a cell header processing means outputting a destination address and a Header Conversion Table (HCT) writing address to write header conversion information extracted from the destination address whenever a BOM or SSM cell is received and outputting a reading table address in which header conversion information of a cell is stored whenever any cell including a BOM/SSM cell is received; a destination address processing means generating the information (VPIo/VCIo/MIDo) for header conversion from the destination address value delivered from said cell header processing means; and a header conversion processing means storing the header conversion information delivered from said destination address processing means and converting the header value of the cell delivered from said cell header processing means to the corresponding header conversion information stored in the header conversion table.

BRIEF DESCRIPTION OF THE DRAWINGS

This invention may be better understood and its object will become apparent to those skilled in the art by reference to the accompanying drawings as follows:

FIG. 6 is a diagram illustrating multiplexing of several connectionless layer through a point-to-multipoint ATM connection;

FIG. 13 is a detailed configuration diagram of a header conversion processing section shown in FIG. 8;

DESCRIPTION OF THE PREFERRED EMBODIMENTS

Figure 1:
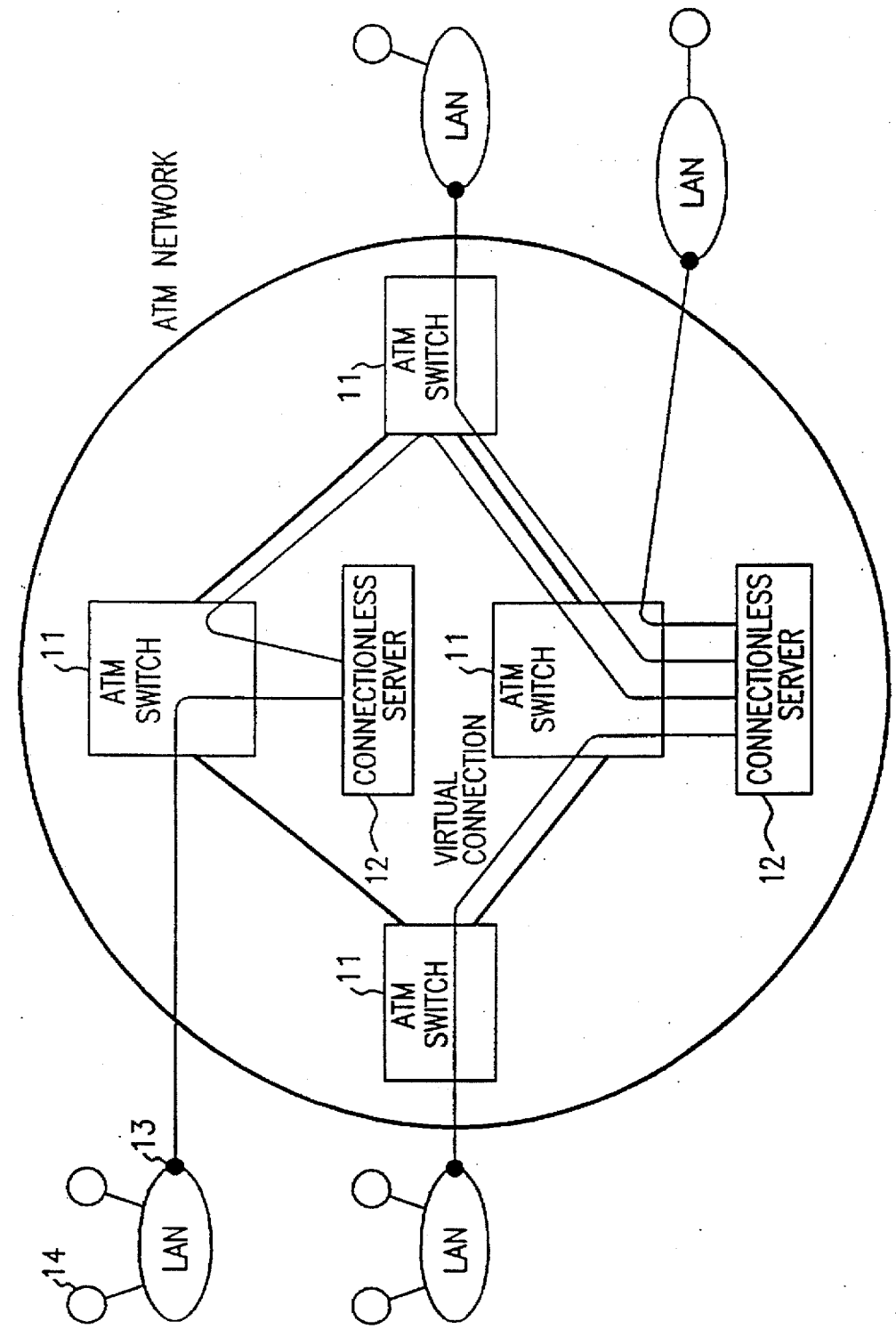
FIG. 1 is a schematic diagram showing the configuration of an ATM network to which the present invention is applied.
Figure 2:
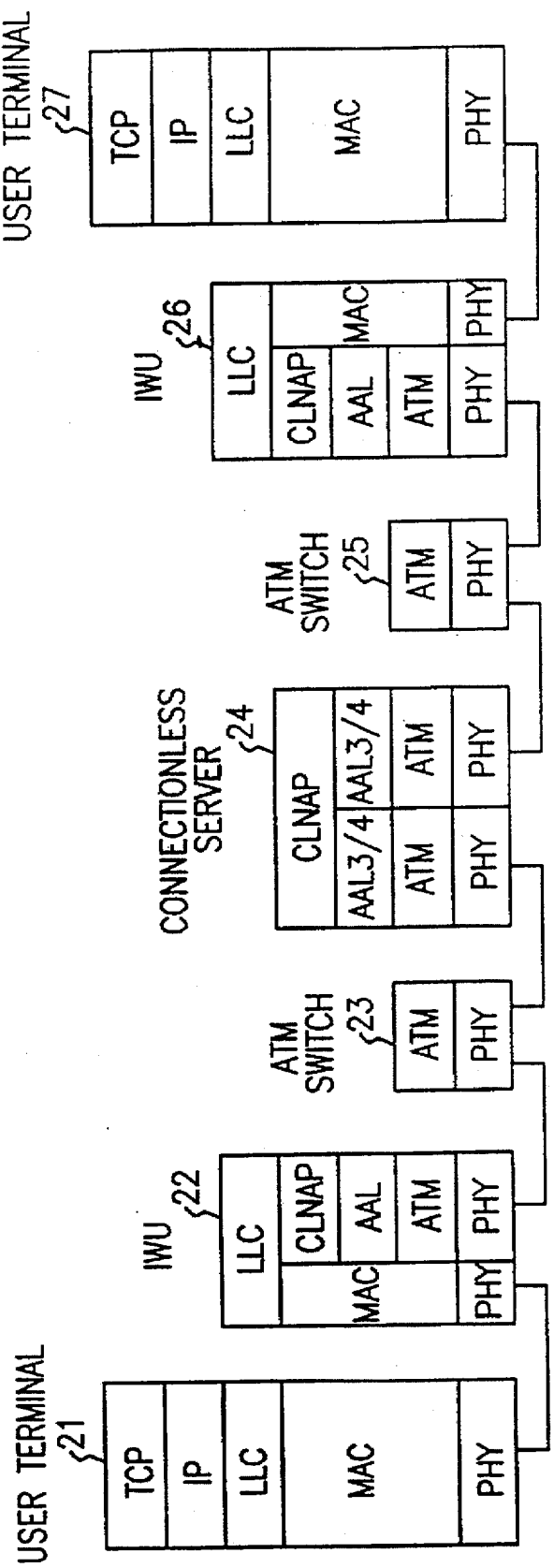
FIG. 2 is a diagram showing a protocol stack of user terminal, IWU, ATM switch and connectionless server.
Figure 3:
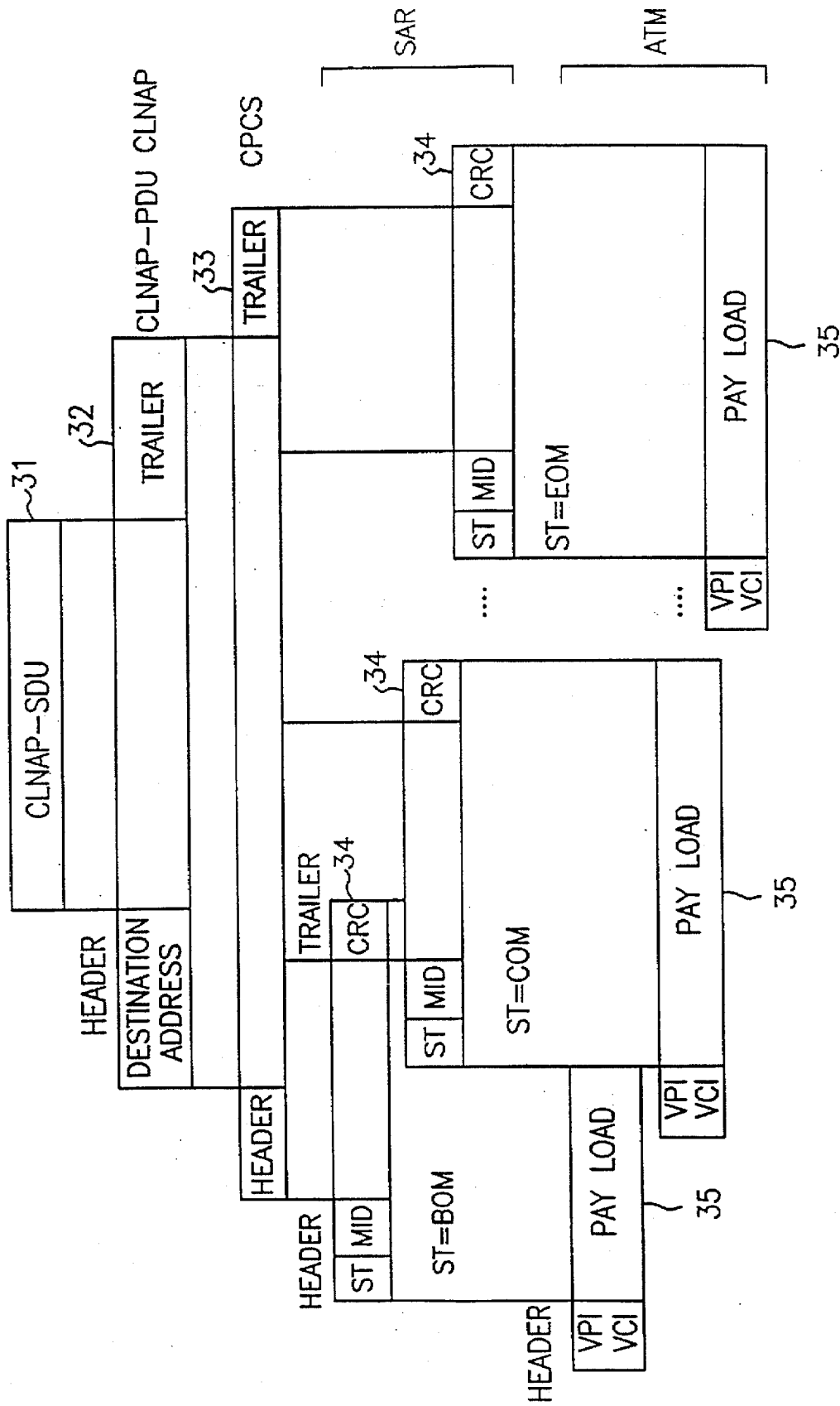
FIG. 3 is a diagram showing a sequence of converting a connectionless data frame (CLNAP-SDU) into cells at an IWU in order that the connectionless data frame received from a source user terminal is transmitted to the connectionless server.
Figure 4A:
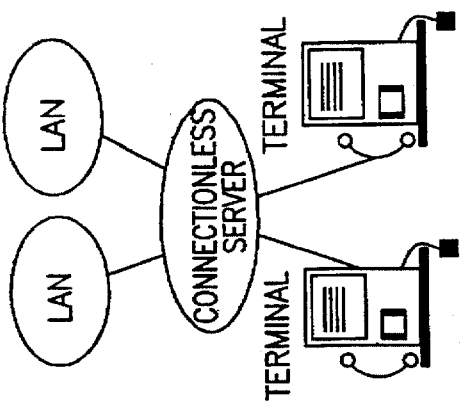
FIG. 4 is a diagram illustrating some examples of connectionless networks.
Figure 4B:
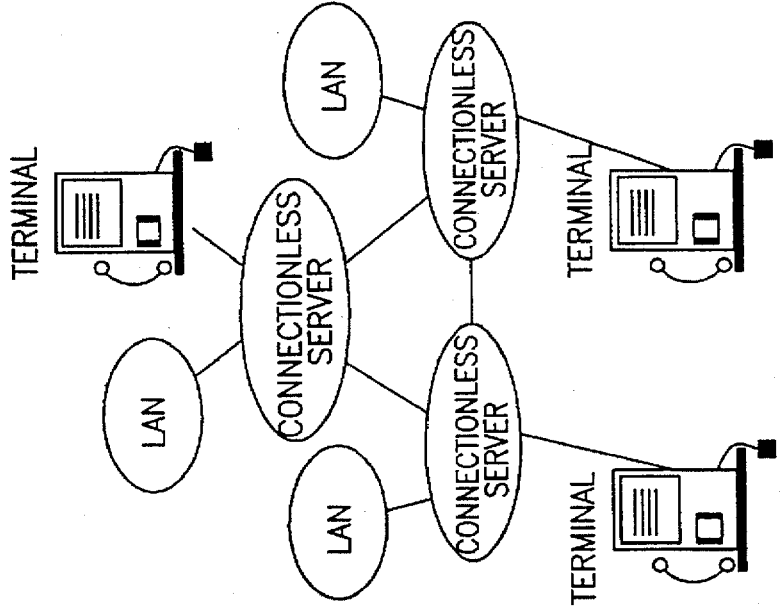
Figure 4C:
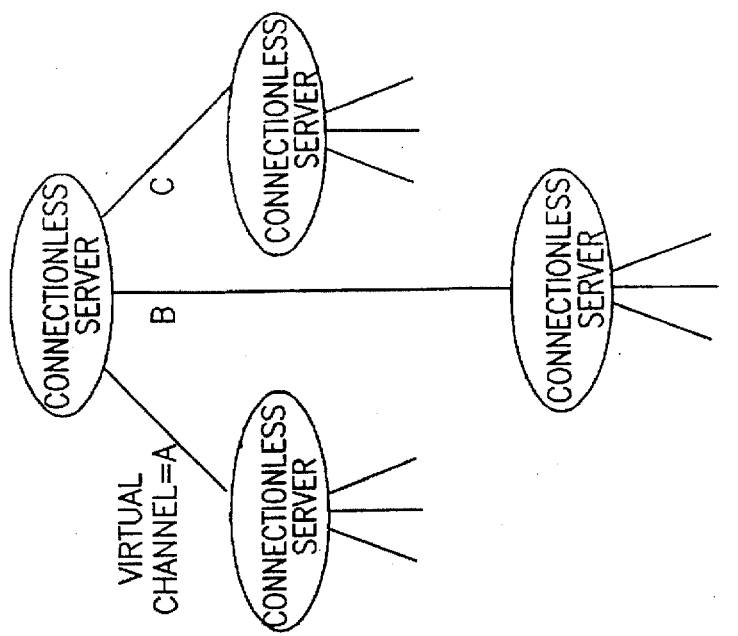
Figure 5B:
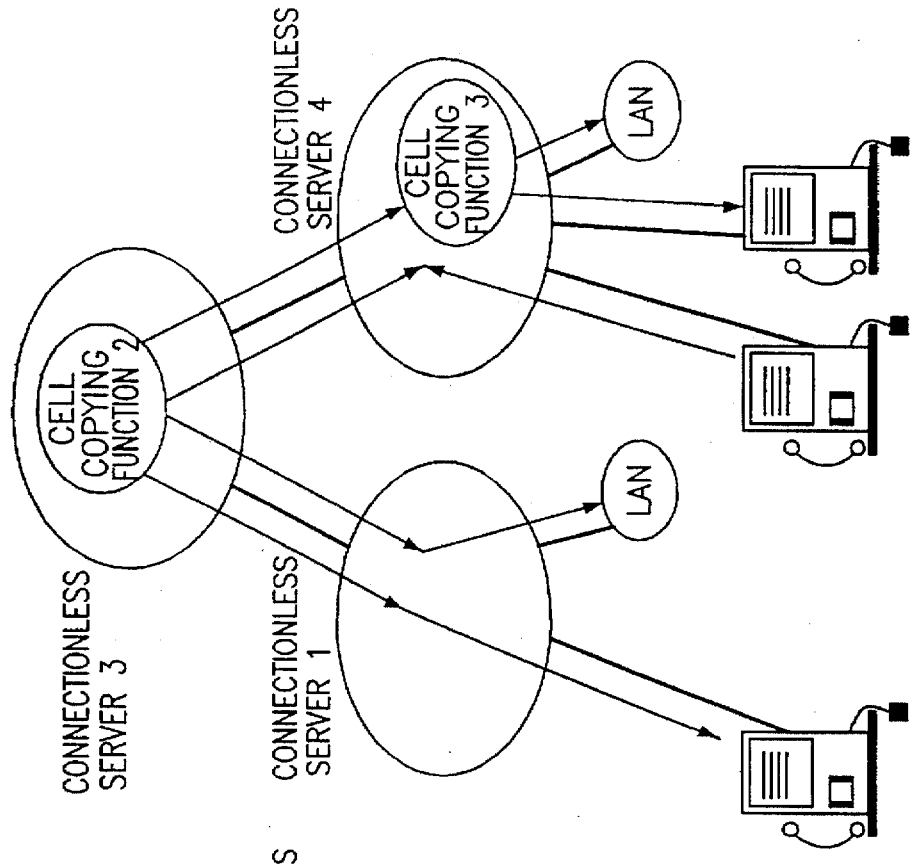
FIG. 5B is a diagram illustrating a method to provide GAA and NGAA.
Figure 5A:
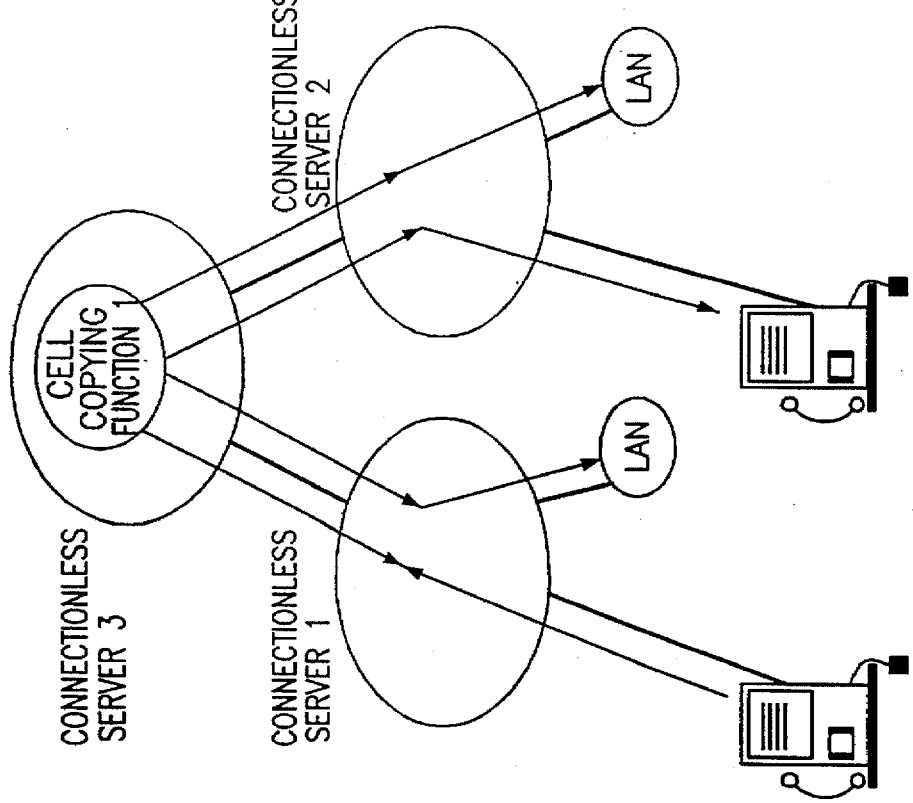
FIG. 5A is a diagram illustrating a method to provide only one GAA in which all multicating frames directed to several individual destinations are copied and delivered.
Figure 7:
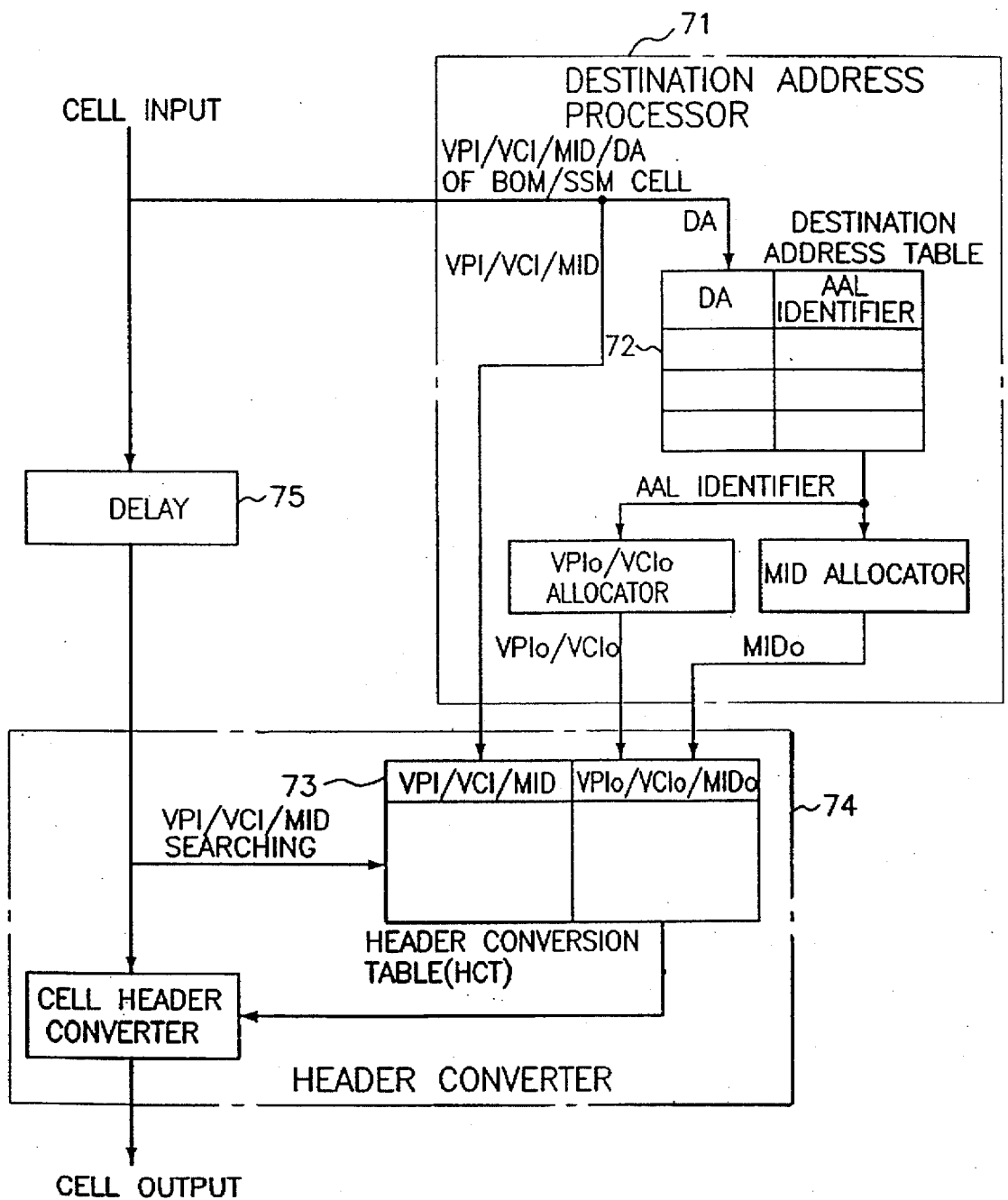
FIG. 7 is a diagram showing a processing principle of the connectionless server according to the invention.

FIG. 7 shows the processing principle of a connectionless server according to the invention.

When a BOM cell or a SSM cell is input, a header value of the cell, VPI/VCI/MID, and a destination address (DA) are delivered to a destination address processor 71. Then, the destination address processor 71 reads an AAL identifier (which is a virtual connection identifier corresponding to the destination address input by searching a destination address table 72 having an ATM adaptation layer identifier) corresponding to the destination address and finds out a virtual connection identifier (VPIo/VCIo), of the ATM layer and a multiplexing identifier (MIDo) by using the AAL identifier for writing them together with a header value (VPI/VCI/MID) of the input cell into a header conversion table (HCT) 73. Such a procedure is to assign the virtual connection identifier to which the cells of a frame according to its destination address are delivered.

In addition, all cells input to the connectionless server are input to a delay means 75. The delay means 75 temporally stores the BOM cell or the SSM cell until the destination address processor 71 generates header conversion information (VPIo/VCIo/MIDo) from the destination address of the BOM or the SSM cell and writes it into the header conversion table 73.

In the header converter 74, the header conversion information delivered from the destination address processor 71 is stored in the header conversion table 73, and the header conversion table 73 is searched using the header value(VPI/VCI/MID) of the cell input from the delay means 75 so that the header value of the cell is converted to the corresponding VPIo/VCIo/MIDo value.

In the invention, the header is converted into the value from the header conversion table according to the header value of the cell regardless of the cell type. Therefore, the server may have a simpler configuration as compared with the conventional server in which an additional header conversion function is required for the BOM cell or the SSM cell.

In the above procedure of the destination address processor 71, the process to search the destination address table 72 with the destination address of 64 bits as a key value is a bottle neck point of the destination address processor 71, and the process to search the header conversion table 73 using the VPI/VCI/MID value of 38 bits is a bottle neck point of the header conversion means 74.

Accordingly, in the present invention, a CAM is used to simplify the table searching function and to minimize the searching time, and 64 bits and 38 bits are used as key values in searching so that a limitation on the number of virtual connections the number of destination addresses in the conventional server is resolved.

In the prior art, a maximum of 256 virtual channels can be used because of mapping a VPI/VCI of 28 bits to a VCI code of 8 bits, and a maximum of 256 destination address values can be searched by mapping the destination address value of only 48 bits among 64 bits in total to a new VCI code of 8 bits. However, it has a disadvantage in that only the 64 virtual channels and only 32 destination addresses are used in the worst case because all regions are not considered in a mapping process to a smaller bit value.

If type MU9C1480 CAM fabricated by MUSIC Semiconductor Corporation is adapted to a server system, the key value of up to 64 bits may be used therein, and searching information of 1024 may be provided for one CAM. Also, a plurality of CAM's are connected in cascade, and thus searching of more information of than 1024 may be provided for the server system.

In the present invention, it separates generation of the headers conversion information from conversion of the header of input cells and performs pipeline processing, so that high speed processing can be performed.

Figure 8:
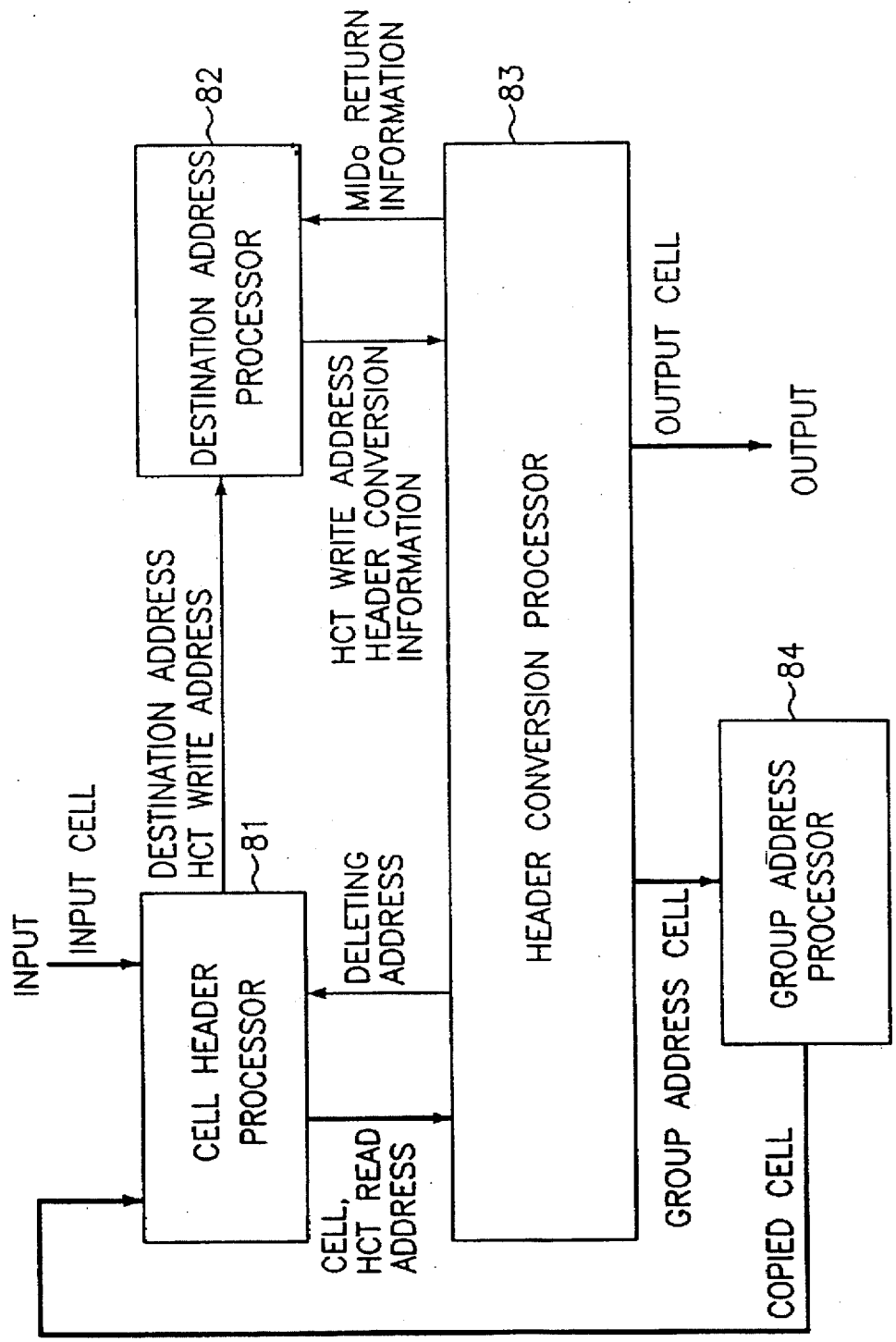
FIG. 8 is a diagram showing the configuration of the connectionless server according to the invention.

FIG. 8 shows a block diagram of a connectionless server according to the present invention. Cell header processor 81 delivers the destination address of the input cell and a HCT write address that is an address value of the header conversion table whenever a BOM or SSM cell is input. Also it delivers a cell and its HCT read address to a header conversion processor 83 whenever any cell including a BOM/SSM cell is input. The destination address processor 82 writes the header conversion information generated according to the destination address to the destination address processor 82. The destination address processor 82 outputs the header conversion information (VPIo/VCIo/MIDo) generated from using the destination address and the HCT write address in which the header conversion information is to be stored in the header conversion processor 83.

The header conversion processor 83 stores the header conversion information input from the destination address processor 82 into the header conversion table, and converts the header value of the cell input from the cell header processor 81 according to the header conversion information stored in the header conversion table and generates a CRC of for the cell.

In addition, the connectionless server system of the present invention further comprises a group address cell processor 84 for copying cells having group addresses and delivering the copied cells to the cell header processor 81. As a result, a multi-casting function may be additionally performed so that group addressed cells are copied and transmitted to the destinations indicated by the individual addresses of the group.

In the header conversion processor 83, CLNAP PDU having a group address may be selectively delivered to the group address cell processor 84. And the group address cell processor 84 has the GAA function as well as NGAA owing to its copying function of group address cells so that it is possible to use network resources efficiently even in case the group address traffic is relatively large.

Figure 9:
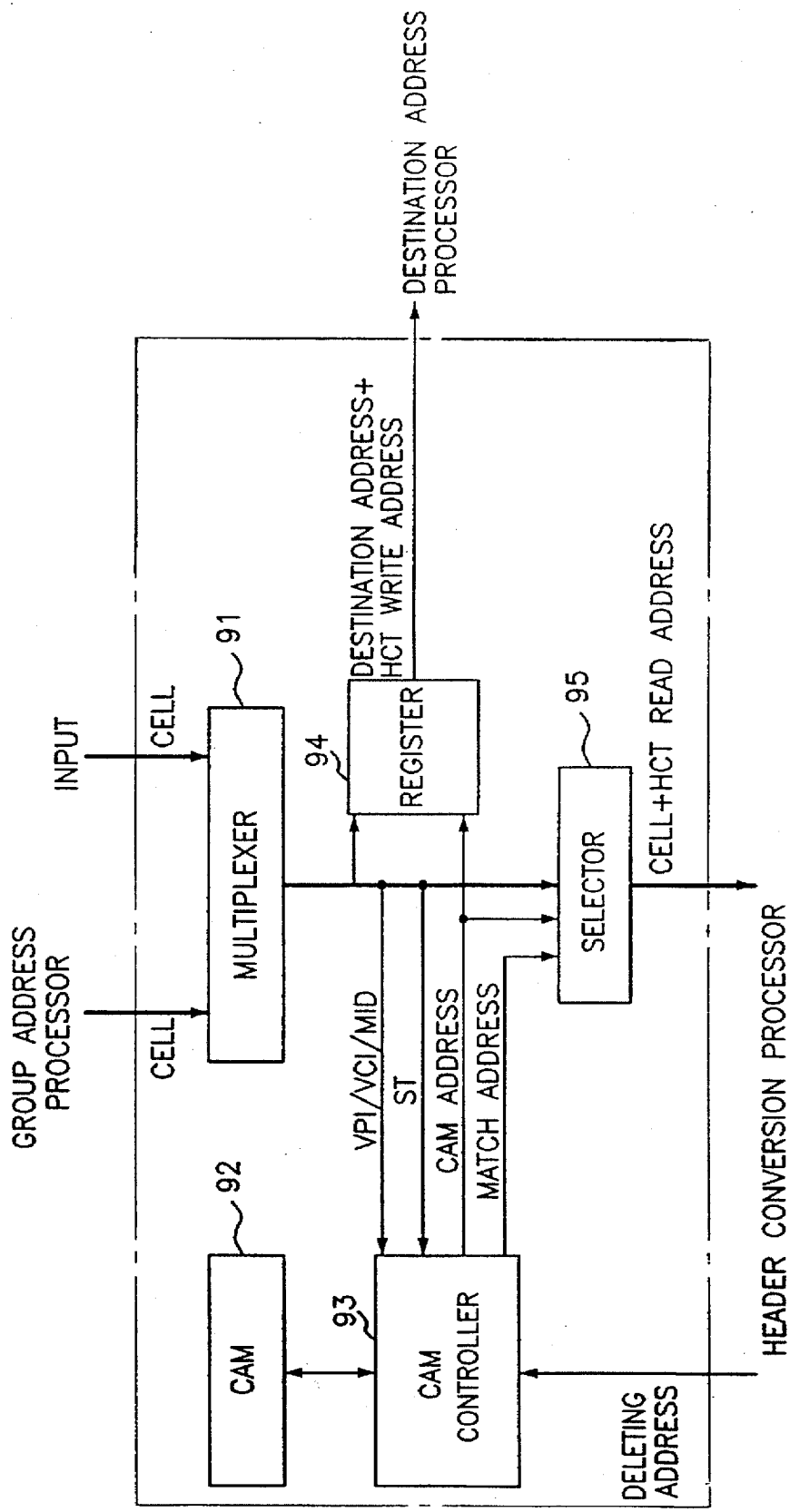
FIG. 9 is a detailed configuration diagram of a cell header processing section shown in FIG. 8.

In the FIG. 9, showing the detailed configuration of the cell header processor 81, a multiplexer 91 multiplexes connectionless cells input from the terminal and cells input from the group address processor 84 and CAM 92 stores key values of 38 bits width.

CAM controller 93 extracts the cell type value (ST) and the VPI/VCI/MID value from the received cell. At this time, if the cell type value is BOM or SSM, the CAM controller 93 outputs a CAM address which is the next free address of the CAM and stores the VPI/VCI/MID value into the next free region of the CAM as the key value, and if the cell type value is COM or EOM, the CAM controller 93 searches the VPI/VCI/MID value of the cell from the CAM and outputs a match address value. And if the CAM controller 93 receives a removing address value from the header conversion processor 83, it removes the key value stored in the CAM of the address.

If the input cell is the BOM or the SSM cell, a register 94 temporarily stores the destination address of the cell and the CAM S address output from the CAM controller 93 as an HCT write address value, and delivers them to the destination address processor 82. Selector 95 takes the CAM address if the input cell is a BOM or SSM cell and the match address if the input cell is a COM or EOM cell as the HCT read address, and outputs it to the header conversion processor 83 together with the cell.

In the present invention, CAM's correspond to the header conversion tables of the header conversion processor in one to one in order to make the inspection function of the header conversion table by means of the cell header and header conversion function are independently operated from each other. If the first cell of CLNAP PDU, i.e. BOM or SSM, is inputted, after searching the next free address of the CAM, the searched address is transmitted to the header conversion processor 83. Also, the VPI/VCI/MID value of a BOM or SSM cell is stored in the next free address of the CAM as a key value so as to make it possible to search the position of the header conversion information for continuous cells, i.e. COM or EOM, constituting the same CLNAP PDU with the BOM cell. Thus, when a COM or EOM cell is inputted, the address of the header conversion table is obtained by searching the CAM with the VPI/VCI/MID value of the cell and transmitted to the header conversion processor 83. However, when an SSM cell is received, the VPI/VCI/MID value of the cell is stored in the CAM as a key value, but is not used. The value is temporarily stored in the CAM in order that the same header conversion table address is not allocated for another CLNAP PDU until header conversion processing of the SSM cell is completed.

Figure 10:
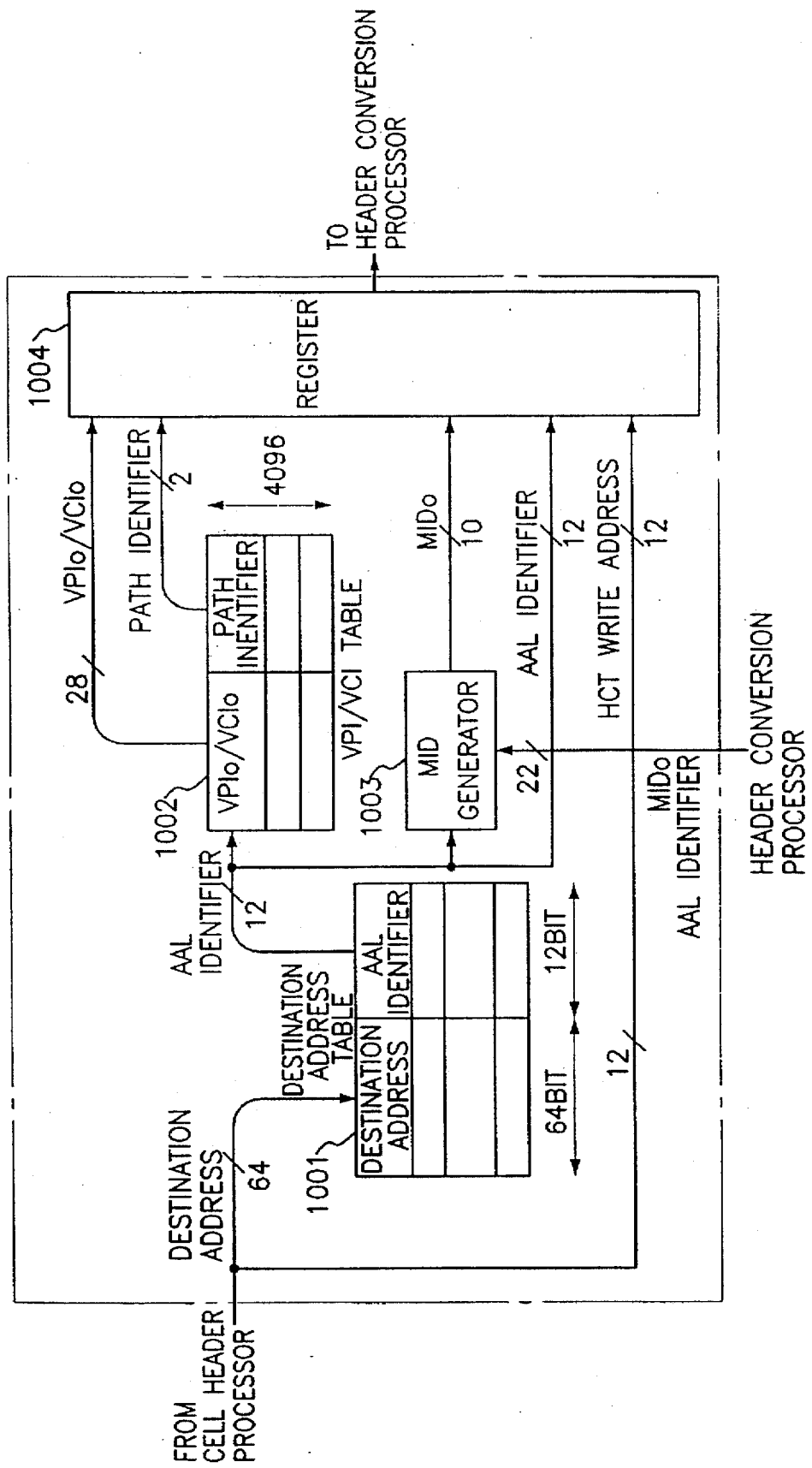
FIG. 10 is a detailed configuration diagram of a destination address processor shown in FIG. 8.

FIG. 10 shows the configuration of the destination address processor 82 in detail.

The destination address processor is an output means of the necessary information (VPIo/VCIo/MIDo) for header conversion using the destination address of 64 bits, and delivers an HCT write address that is the address value.

The destination address table 1001 is comprised of a CAM that has the destination address values registered in the server as the key value, and has AAL identifiers corresponding to the destination address values respectively. Accordingly, the destination address table 1001 outputs the AAL identifier which is the corresponding ATM adaptation layer connection identifier. If the destination address is not registered in the destination address table, the AAL identifier of which 12 bits values are all "0".

If the destination address value is inputted, 64 bits of destination address including the address type field are all searched from the table. Each destination address is mapped in one AAL identifier regardless of whether it is an individual address or group address. Thus, if cell having group address should be delivered to the separate multicast server, said cell can be delivered in the same manner as the cell having a individual address through the virtual connection to the multicast server. A cell having a specific group address can be copied after being delivered to the group address cell processor according to the cell channel identifier of the VPI/VCI table. If a destination address value which is not registered in the destination address table is received, it is delivered to the upper layer server through a virtual connection directed to the upper layer server or removed from the server as a mis-delivered cell.

The VPI/VCI table 1002 has a VPI/VCI value which is the virtual connection identifier of the ATM layer corresponding to the AAL identifier and a path identifier deciding the path of the relevant frame. The path identifier is composed of a combination of 2 bits so that the cells can select one path of the following three paths:

delivery to the destination through a virtual connection, delivery of a group address cell processing part to be copied as individual address cells or removing from the server.

The VPIo/VCIo value of the VPI/VCI table has different significances according to the value of the path identifier. That is, if the path identifier value is set to be delivery to the destination through a virtual connection, the VPIo/VCIo value indicates the virtual connection identifier value to which the cell is to be delivered. If the path identifier value is set to be delivery to the group address processor 84, the VPI is assigned a specific value indicating a cell which is processed in the group address processor 84 (for example, in case that all bits are 1) and the VCIo is assigned the group address identifier mapped one to one with the group addresses. This group address identifier is used for selecting the group address table having the individual addresses corresponding to the group address in the group address cell processor.

The MID generator 1003 allocates MIDo to the CLNAP PDU within the allowed MID scope, and also receives the used MIDo together with the AAL identifier from the header conversion processor in order to allocate it to another CLNAP PDU.

The register 1004 temporarily stores information so that information having different generating times respectively may be delivered to the header conversion processor 83 at the same time.

Figure 11:
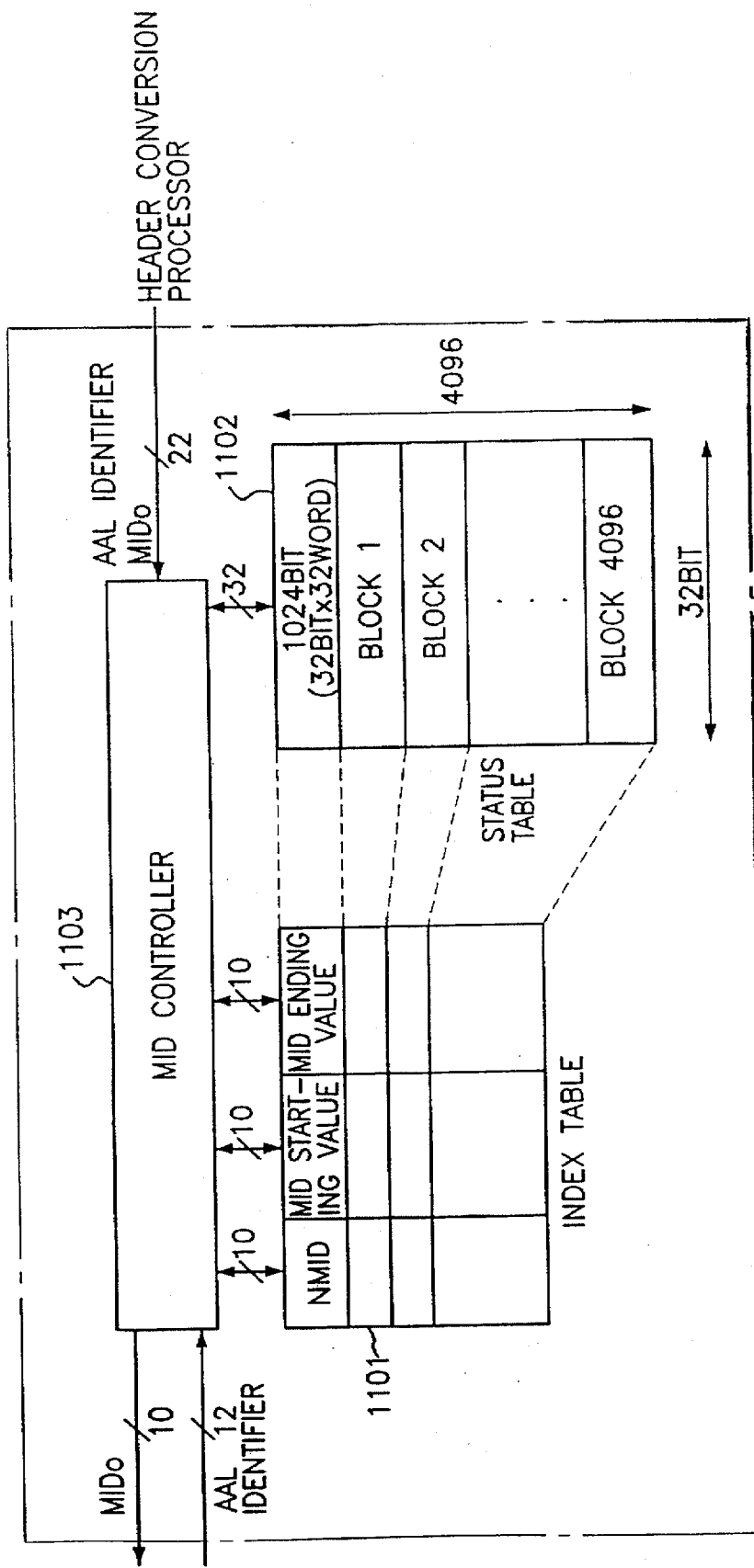
FIG. 11 is a detailed configuration diagram of an MID controller shown in FIG. 10.

FIG. 11 shows the detailed configuration the MID generating means shown in FIG. 10.

The MID index table 1101 has the MIDo value to be allocated for the next CLNAP PDU and a MID starting value as a well as MID ending value indicating the available scope of the MIDo value of each AAL connection. In the MID status table 1102, a maximum of 1024 MID values which can be allotted in the respective ATM adaptation layer connection are mapped in one to one bit unit and each bit indicates whether the mapped MID with it is used or not.

The MID controller 1103 allots the MIDo corresponding to the AAL identifier according to the status of MID index table 1101 and MID status table 1102, and changes the MID index table 1101 and MID status table 1102. Also, the MID controller changes the MID status table 1102 according to the MIDo and the AAL identifier received from the MID header conversion processor. In such a method, each MID is mapped with one bit of the MID status table. Accordingly, the memory capacity required for MID allocation can be considerably reduced. The MID range of each AAL connection can be assigned independently with other AAL connections. Therefore, MID values are allotted to AAL identifiers each in the range of from a starting value of the MID to an ending value of the MID.

Figure 12A:
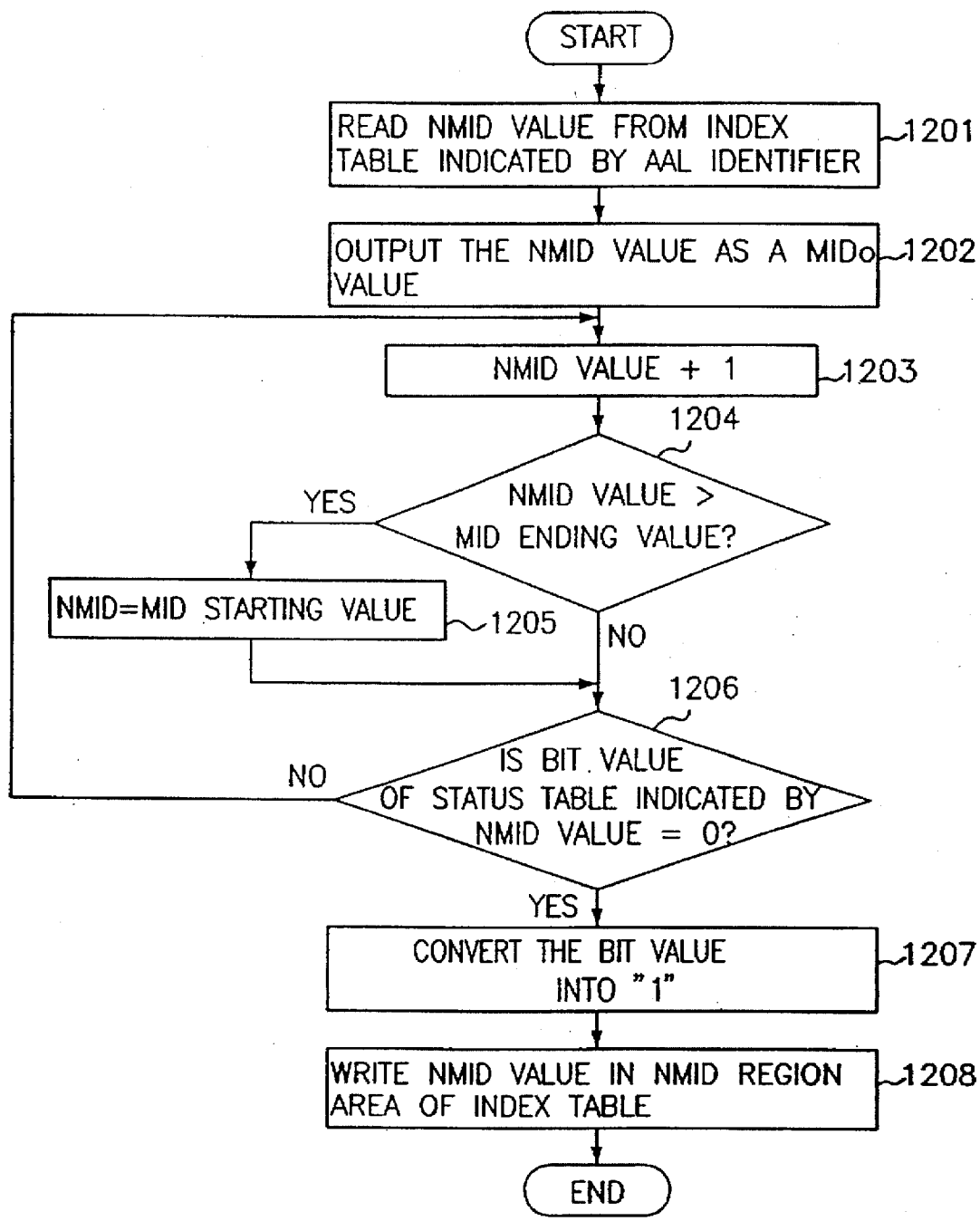
FIG. 12 is a flow chart showing the operation of the MID controller of FIG. 11.
Figure 12B:
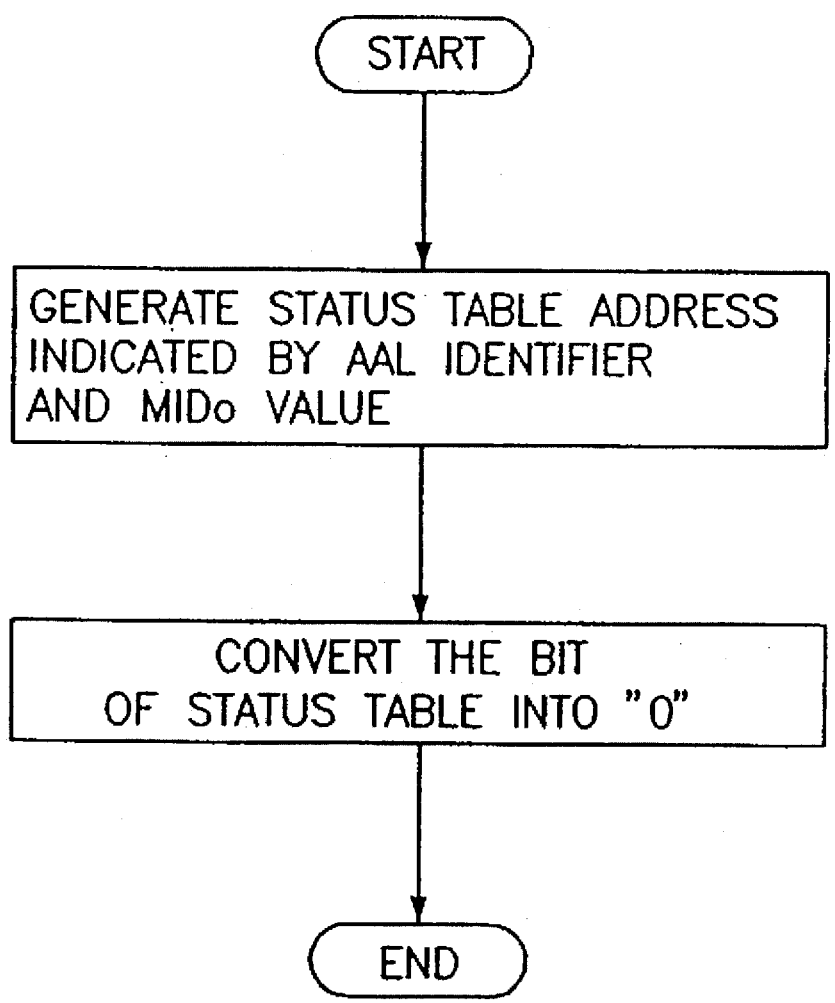

FIG. 12 is a flow chart showing operation of the MID controller shown in FIG. 11. In FIG. 12A, if the AAL identifier is delivered, the corresponding MIDo value is allotted and the table value is changed, and in FIG. 12B, if the AAL identifier and MIDo are input from the header conversion processor, the status table is changed.

The operating process, as shown in FIG. 12A, is as follows.

If the AAL identifier is input, the NMID value is read from the MID index table indicated by the AAL identifier (step 1201) and then the NMID value is output as a MIDo value (step 1202). The read NMID value is increased by 1 (step 1203), and if the increased value is larger than the MID ending value (step 1204), the MID starting value of the next MID index table is allotted to the NMID value (step 1205), and then the bit value in the status table corresponding to the NMID is examined(step 1206).

If the corresponding bit value is 1, that is in case that the relevant MID value is already allotted for another CLNAP PDU, it returns to step 1203. If the corresponding bit value is 0, it is changed to 1 (step 1207) to indicate that it is being used, and then the increased NMID value is written in the NMID field of the MID index table (step 1208).

FIG. 12B shows the process of recovering the used MIDo in the header conversion processor, and the AAL identifier indicates the ATM adaptation layer connection to which the MIDo is applied, Therefore, the bit value corresponding to the MIDo in the block which corresponds to the AAL identifier of the MID status table is changed to 0.

FIG. 13 exhibits the detailed configuration of the header conversion processor 83.

In the header conversion processor, header conversion information received from the destination address processor 82 is stored in the header conversion table, and the header value of the cell inputted simultaneously with an HCT read address value is changed by header conversion information from the header conversion table according to the HCT read address. In addition, the path of the cell is determined based on the path identifies included in the header conversion information.

The header conversion table 1301 is composed of a memory with 52 bits per word. Out the header conversion information of 64 bits delivered from the destination address processor, the HCT write address bus of 12 bits containing the write address of the header conversion table is connected to the write address bus and the other 52 bits containing header conversion information are connected to the write data bus for storing in the header conversion table 1301.

The delaying means 1302 is a means to temporarily store a BOM/SSM cell inputted from the cell header processor 81 until header conversion information corresponding to the destination address value of the cell is delivered from the destination address processor 82 and stored in the header conversion table. In this process, a COM or EOM cell may not be delayed but the delaying means should process cells on a first come first served basis. The above cell is stored in the shift resistor 1303 temporarily until the HCT read address of the cell passing through the delay circuit 1302 is transferred to the address bus-R of the header conversion table for reading header conversion information, and then the VPI, VCI and MID fields are changed to the values from the header conversion table in the cell header conversion means 1304.

As for the cells passing through the cell header conversion means 1304, the output path is detesmined by the path identifies in the cell path divides 1305. That is, the cell is delivered to the CRC generator 1306 for generating the pay load CRC in the CRC field, and then output to the network in case that the path identifier value is 00. The cell is delivered to the group address processor in case of 10, and removed in case of 11.

If a cell which pass the delaying means is EOM or SSM, the register 1307 latches the HCT read address of the cell for delivering it as the deleting address header processing means, resulting in removing the key value of the CAM, and latches the AAL identifier and MIDo value out of the header conversion information for delivering it to the destination address processor, resulting in recovering the used MIDo value of the MID generating means.

Figure 14A:
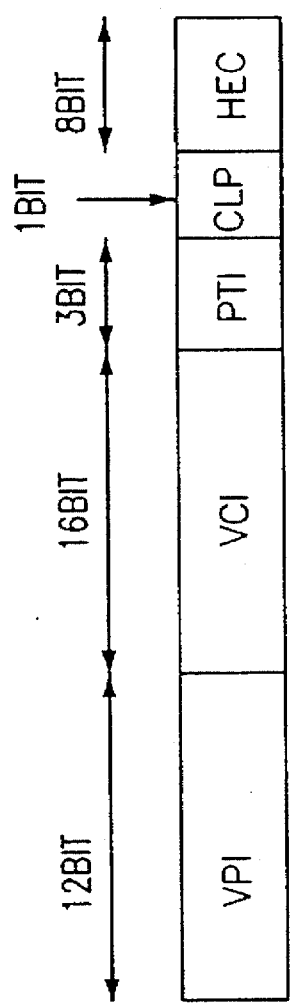
FIG. 14 is a diagram showing the header format of a cell from the header conversion processing section.
Figure 14B:
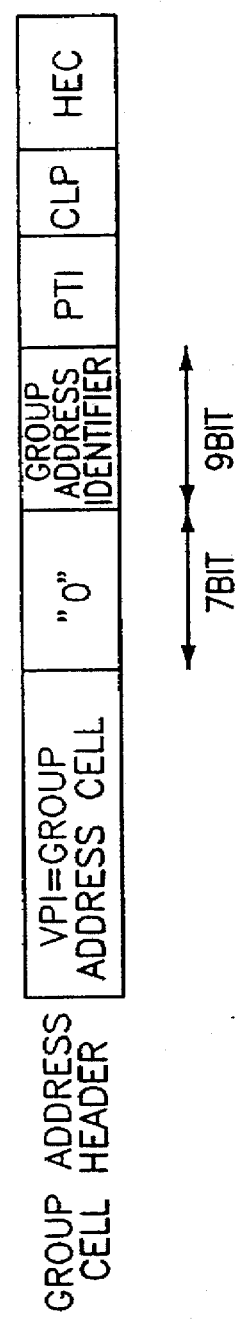

FIG. 14 shows the header format of the cell output from the header conversion processor 83. FIG. 14A indicates the header format of a cell transferred to the network through the CRC generator 1306 and FIG. 14B indicates the header format of group address cell delivered from the header conversion processor to the group address cell processor.

The VPI/VCI region of the cell transferred to the network has the virtual connection identifier value to which the cell is to be delivered. But the specific value indicating the group address cell is assigned to the VPI field of the cell delivered to the group address cell processor, and the upper 7 bits out of the VCI field of 16 bits are all "0" and the group address identifier is assigned to the other 9 bits in one to one mapping with the group address. Therefore, in the group address cell processor, it is possible to search the group address table by using only a 9 bit group address identifier instead of a 64 bits destination address value included in a BOM or an SSM cell in order to copy a group addressed CLNAP PDU, and by using only 9 bits of instead of 38 bits VPI/VCI/MID for a COM or EOM cell, resulting in a simpler group address cell processing function. Since the specific VPI value indicating the group address cell passes the group address cell processor for delivery to the cell header processor without conversion, the connectionless server should not have the same VPI value so that it may be distinguished from the cells transferred from the network.

Figure 15:
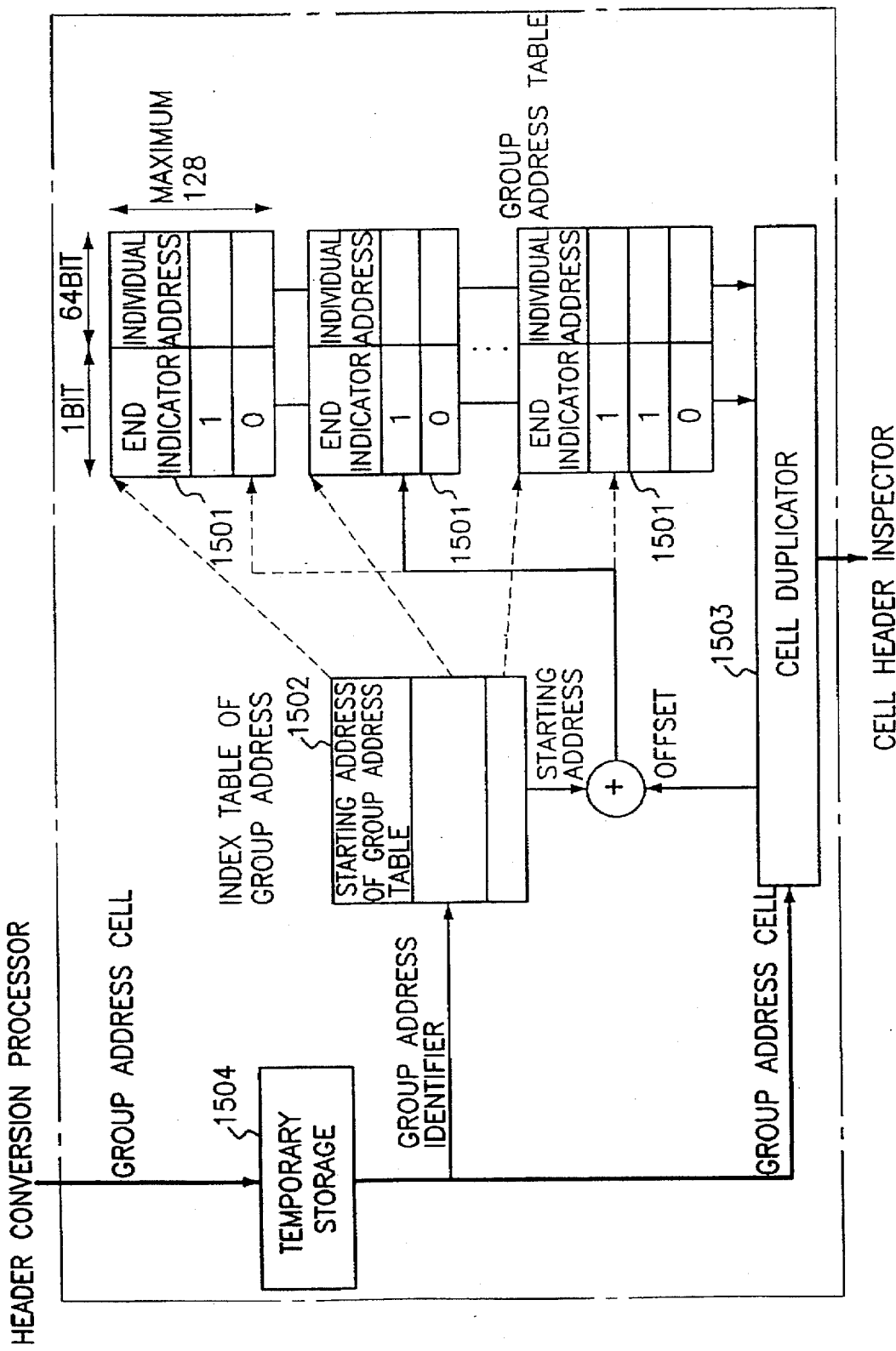
FIG. 15 is a detailed configuration diagram of a group address cell processing section shown in FIG. 8.

FIG. 15 exhibits the detailed configuration of the group address cell processor 84 for copying an input group address cell to a plurality of individual address cells.

The group address cell processor includes a plurality of group address tables 1501 having a plurality of individual address values included in the group address, and the group address tables have different sizes according to the number of the individual address thereof. Accordingly the group address tables include an end indicator and several individual addresses corresponding to the group address identifier in one to one.

The group address index table 1502 an index of group address tables corresponding to the group address identifier in order to search the group address tables quickly.

When a group address cell is inputted in the cell copying means 1503, the cell copying means 1503 stores it therein and reads the individual address information included in the group address sequentially for copying it to a plurality of individual address cells.

When the cell is inputted in the group address cell processor, a cell is stored in the temporary storage 1504 and then delivered to the cell copying means if the cell duplicator 1503 is in an idle state. And the group address cell processor searches the starting address of the corresponding group address table 1501 using the group address identifier. Afterwards, the individual address and end indicator pointed to by the sum of the starting address and offset is delivered to the cell copying means 1503.

The initial value of the offset from the cell duplicator 1503 is 0 and increased by 1 whenever the information of a group address table is transferred to the cell duplicator 1503 until the end indicator of "0" indicating the last individual address is transferred.

Figure 16:
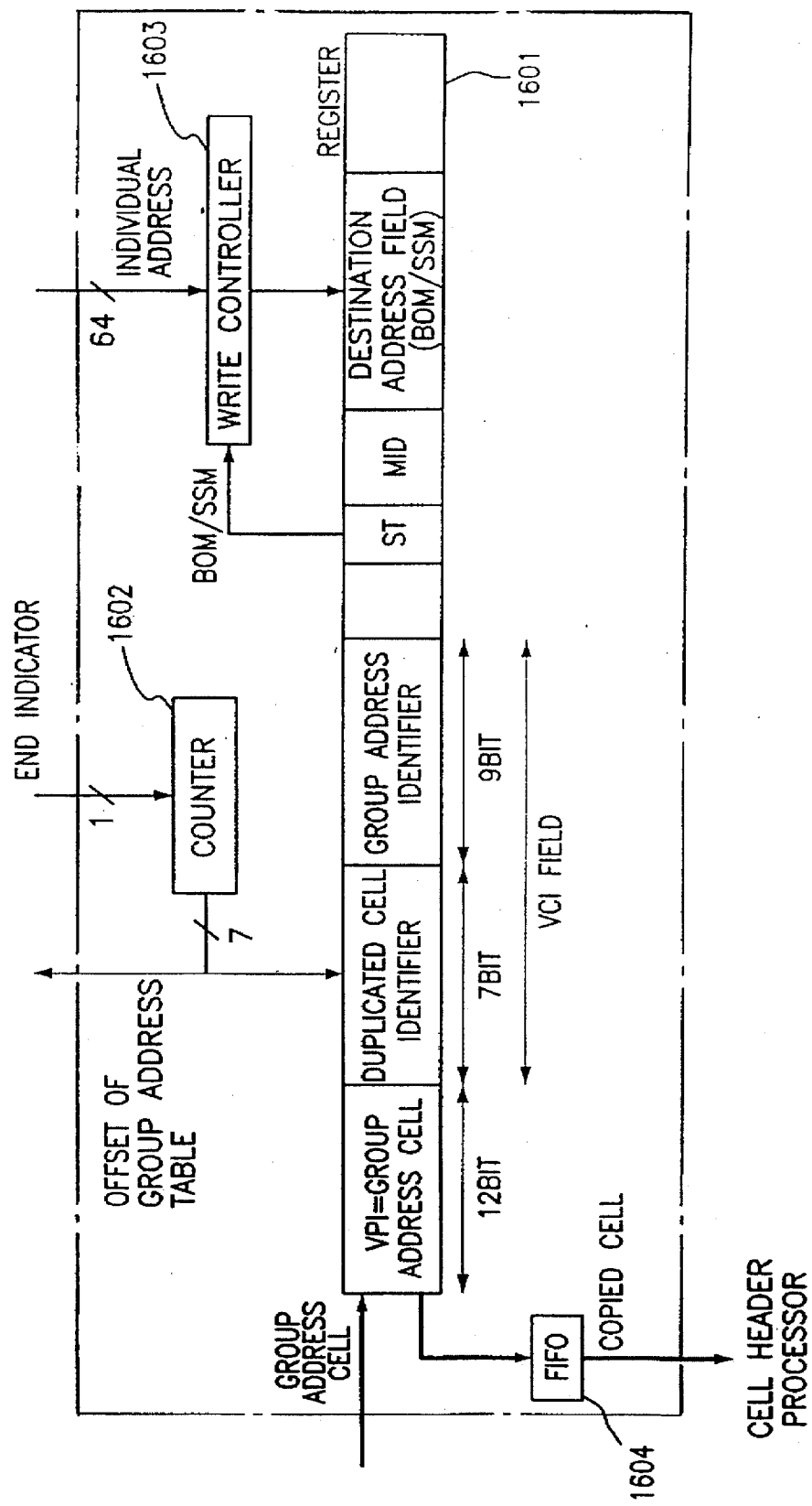
FIG. 16 is a detailed configuration diagram of a cell copying section.

FIG. 16 exhibits the detailed configuration of the cell duplicator.

The cell duplicator 1503 is composed of a register 1601 performing a copying function after changing the VCI field and the value of the destination address field, a counter 1602 which is cleared to 0 when a cell is received and increased by 1 whenever a cell is copied, a write controller 1603 writing the input individual address value in the destination address field only when the stored cell in the register is BOM or SSM, and FIFO 1604 temporarily storing the copied cell.

When a group address cell is received, it is stored in the register 1601 and the counter 1602 is cleared to 0. The counter 1602 output is used as the offset of a group address table to read the individual address stored in the group address table sequentially and also used as the copied cell identifier to classify the copied cells. If the end indicator and the individual address value are received from the group address table, the output of the counter 1602 is stored in the copied cell identifier field, and the individual address value is stored the destination address field. Then the cell in the register is delivered in the FIFO 1604 and then the value of the counter is increased by 1 for reading the next information of the group address table and copying the cell as above. If the input end indicator is 0, since it means the last information of the group address table, the operation is stopped after copying the cell using the input individual address until the next group address cell is received.

In the above process, only when the cell stored in the register is BOM or SSM, the destination address field exists as shown in FIG. 16. So the writing of the individual address is controlled by the write controller 1603.

Figure 17:
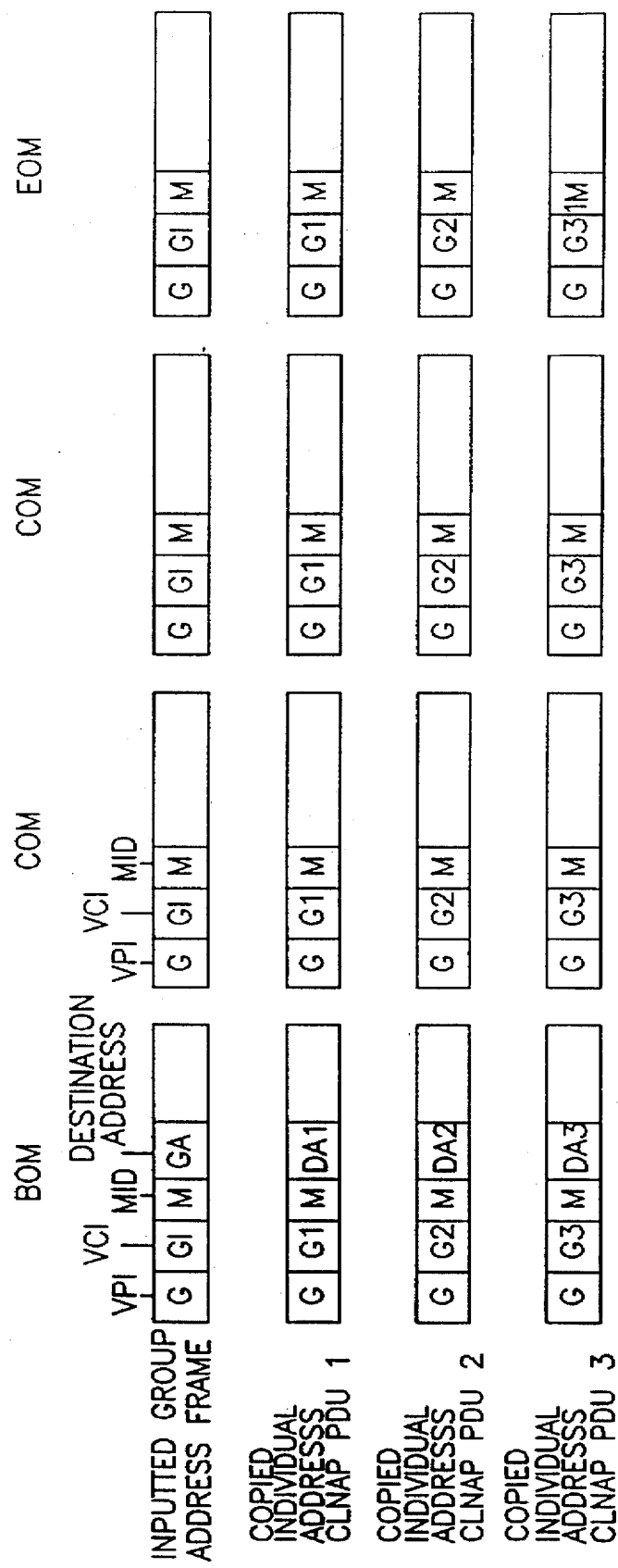
FIG. 17 is a diagram showing header formats of a group address cell and a copied individual address cell in the cell copying section.

FIG. 17 indicates the header format of the group address cell and the copied individual address cells in the cell duplicator.

In the present invention, for simplifying the configuration of the group address cell processor, allocation of VPI/VCI and MID for copied cells is performed in the destination address processor and header conversion processor. Thus copied cells are delivered to the header processor.

The VPI/VCI/MID field values of the cells comprising a group address CLNAP PDU are all the same. Hence if these are copied to a plurality of cells, the destination address field of a BOM/SSM cell is converted to an individual address value and different values are assigned to the copied cell identifier of the cell in order to distinguish the copied CLNAP PDUs. In this way, the copied individual address CLNAP PDU 1, CLNAP PDU 2 and CLNAP PDU 3 are delivered to the cell header processor having different VCI values from each other.

Since the cell copying function is included in the server in it present invention, it is possible to use the as a server for performing routing of cells having individual address values as a multicast server for only performing copying of cells having group address values and as a compound connectionless server which is able to process both group address and the individual addresses. To meet length changes in the country code, national destination code or subscriber number included in the destination address, routing is performed by using all 64 bits of the destination address.

In addition, other address systems such as MAC (Medium access control) or IP (Internet protocol) address as well as E.164 may be used as the destination address, and several terminals can be connected to the connectionless server through one ATM virtual connection by assigning different MID ranges to the terminals, and the header conversion table searching function and the function of writing or reading the header conversion information in a header conversion table are separated.

As a result, each function is simplified can be performed by pipe line processing, resulting in high speed operation.

What is claimed is:

1. A connectionless server comprising:

cell header processing means for receiving cells having headers with header values, for delivering a destination address and an HCT (Header Conversion Table) write address to write header conversion information generated from the destination address whenever a BOM (Beginning Of Message) or SSM (Single Segment Message) cell is received, and for delivering a received cell and an HCT read address at which header conversion information for the received cell is stored whenever any cell, including a BOM or SSM cell, is received;

destination address processing means for searching the header conversion information (VPIo/VCIo/MIDo) using a destination address value delivered from said cell header processing means; and header conversion processing means for storing header conversion information delivered from said destination address processing means and converting the header value of said received cell by corresponding header conversion information stored in a header conversion table.

2. The connectionless server according to claim 1, wherein said server further comprises group address cell processing means for copying cells having a specific group address and delivering the copied cells to said cell header processing means.

3. The connectionless server according to claim 2, wherein the group address cell processing means comprises:

a plurality of group address tables having individual addresses corresponding to each group address;

a group address index table having starting addresses of the group address tables;

cell copying means for copying a group address cell and changing the header of the group address cell by information in a corresponding group address table; and temporary storage means for temporarily storing group address cells received from said header conversion processing means until said cell copying means is in an idle state.

4. The connectionless server according to claim 3, wherein said cell copying means comprises:

a register for converting and copying a VCI field region and a destination address field after storing one group address cell;

a counting means which is cleared to 0 when said cell is stored in said register and increased by 1 whenever said cell in said register is copied;

write control means for writing an individual address value in the destination address field only when said cell stored in said register is BOM or SSM; and a FIFO for temporarily storing copied cells in said register.

5. The connectionless server according to claim 2, wherein said cell header processing means comprises:

a multiplexer for multiplexing cells received from an external source terminal and cells received from said group address cell processing means;

a CAM for storing key values of 38 bits;

CAM control means for generating a CAM address which is the next free address of the CAM in which a key value is not stored or a match address in which a VPI/VCI/MID value of the received cell is stored according to a cell type value of the received cell, and removing the relevant key value stored in said CAM when receiving a removing address value from said head conversion processing means;

a register, if said received cell is BOM, or SSM, for temporarily storing the destination address of said cell and the CAM address which is output of said CAM control means as the HCT write address, and then delivering them to said destination address processing means; and selecting means for delivering said received cell, together with the CAM address when said received cell is BOM or SSM or the match address when said received cell is a COM (Continuation Of Message) cell or an EOM (End Of Message) cell as the HCT read address, to said header conversion processing means.

6. The connectionless server according to claim 1, wherein said destination address processing means comprises:

a destination address table having an ATM adaptation layer connection identifier (AAL identifier) corresponding to the destination address;

a VPI/VCI table having a path identifier and VPIo/VCIo corresponding said AAL identifier;

MID (Multiplexing IDentifier) generating means for generating a MIDo value corresponding to said AAL identifier; and a register for temporarily storing the HCT write address, said AAL identifier which is the output of said destination address table, the MIDo value of said MID generating means, and said path identifier and the VPIo/VCIo of said VPI/VCI table, and delivering them to said header conversion processing means at the same time.

7. The connectionless server according to claim 6, wherein said MID generating means comprises:

an index table having an NMID (next MID) field storing a MID value to be assigned to an incoming CLNAP PDU (Connectionless Network Access Protocol—Protocol Data Unit), a MID starting value field and a MID ending value field;

a status table indicating whether each MID value is assigned or not; and a MID controller for assigning the NMID field value of said index table to MIDo and updating the NMID value according to the information of said status table when said AAL identifier is received, and changing a bit of the status table to 0 when said AAL identifier and MIDo value are received from said header conversion processing means.

8. The connectionless server according to claim 6, wherein said connectionless server system output said AAL identifier of which 12 bits are all 0, if the destination address value received from said cell header processing means does not exists in a destination address table.

9. The connectionless server according to claim 6, further comprising group address cell processing means for copying cells having a specific group address and delivering copied cells to said cell header processor means, and wherein VPIo/VCIo of said VPI/VCI table indicates an ATM virtual connection identifier value to which the received cell is to be delivered if the received cell is to be delivered to the outside of the connectionless server, or indicates a group address identifier to select a corresponding group address if it is to be copied in said group address cell processing means.

10. The connectionless server according to claim 1, wherein said header conversion processing means comprises:

a header conversion table storing header conversion information generated by said destination address processing means;

delaying means for temporarily storing said received cell and HCT read address until the header conversion information of the stored cell in said delaying means is stored in the header conversion table;

cell header conversion means for converting the header value of the received cell by the header conversion information read from the header conversion table;

cell transmission path dividing means for selecting an output path of the received cell according to a path identifier;

CRC generating means, responsive to the cell header conversion means, for generating a cell CRC; and a shift register for temporarily storing the received cell until header conversion information is delivered to the cell header conversion means from the header conversion table.

11. The connectionless server according to claim 2, further comprising group address cell processing means for copying a cell having a specific group address and delivery a plural number of copies of the copied cell to said cell header processing means.

* * * * *